Patented Mar. 27, 1945

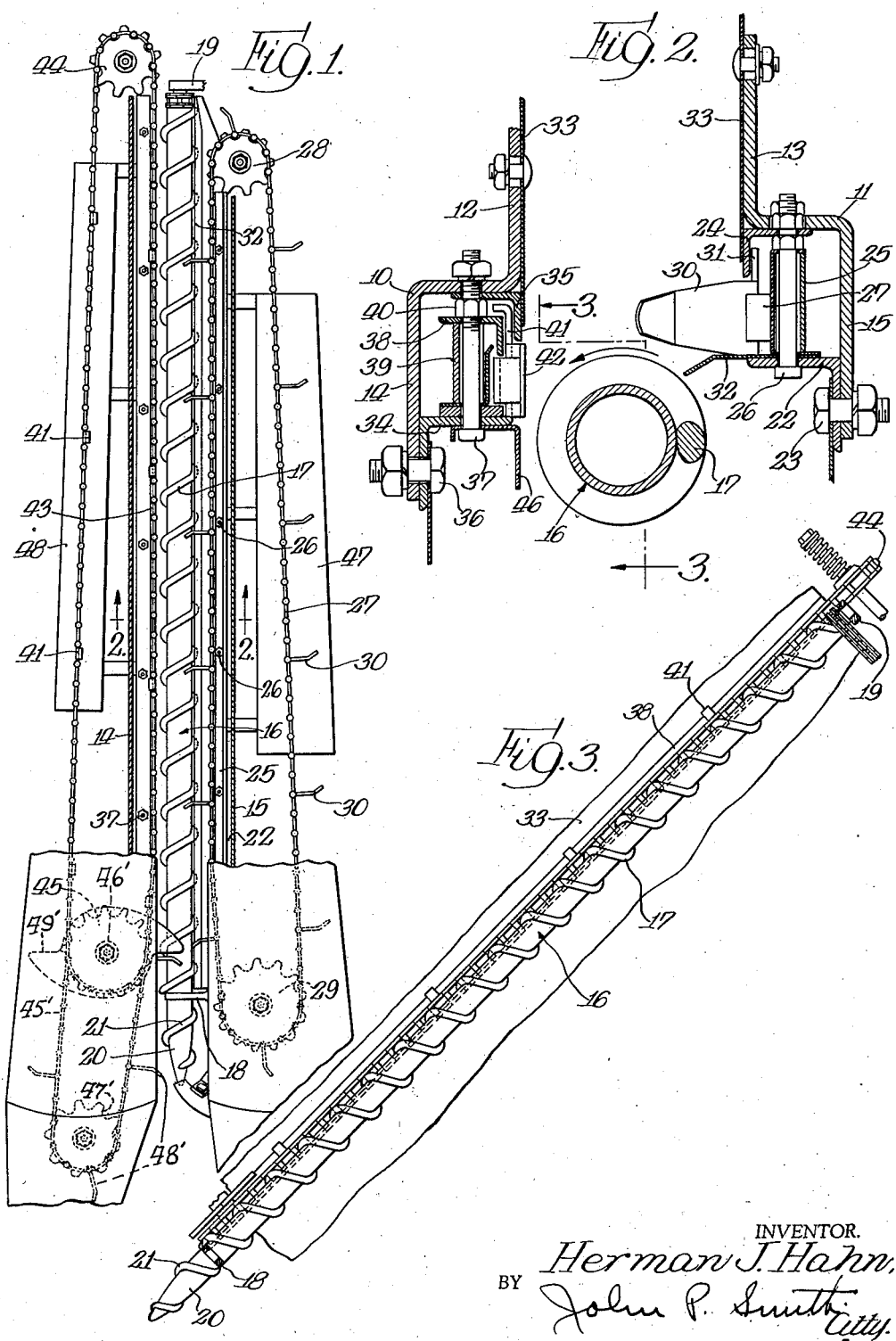
March 27, 1945. H. J. HAHN 2,372,569
CORN HARVESTER
Filed Aug. 9, 1941
INVENTOR.
Herman J. Hahn,
BY John P. Smith
Atty.

2,372,569

UNITED STATES PATENT OFFICE 2,372,569

CORN HARVESTER

Herman J. Hahn, Napoleon, Ohio, assignor to The Oliver Corporation, a corporation of Delaware Application August 9, 1941, Serial No. 406,124

11 Claims. (Cl. 56—107)

The present invention relates generally to corn harvesters, but more particularly to a novel and improved construction of snapping rolls and associated mechanism for corn pickers and huskers.

The primary object of the present invention is to provide a novel and improved ear snapping and conveying mechanism for a corn picker and husker which will more efficiently snap the ears of corn from the corn stalks and elevate the same to the husking mechanism.

A still further object of the invention is to provide a novel and improved ear snapping mechanism for corn picker and husker in which a snapping roll provided with a spirally arranged member cooperates with an endless chain in such a manner that the spiral of the roll conveys rearwardly and upwardly at a different speed than that of the chain so as to effectively rotate the ear of corn in the operation of snapping the same from the stalk.

A still further object of the invention is to provide a novel and improved ear snapping mechanism for corn harvester in which a longitudinally extending forwardly inclined snapping roll is provided with a spirally arranged coil which is adapted to cooperate with an endless chain driven at a rate of speed relatively faster than the travel of the coil on the roll so as to effectively revolve the ear during its rearward movement to effect the snapping of the ear from the stalk.

These and other objects are accomplished by providing a construction and an arrangement of the various parts in the manner hereinafter described and particularly pointed out in the appended claims.

Referring to the drawing:

Fig. 1 is a fragmentary top plan view of a corn harvester showing my improved ear snapping mechanism embodied therein;

Fig. 2 is an enlarged cross sectional view taken on the line 2—2 in Fig. 1; and

Fig. 3 is a fragmentary side elevational view of the construction shown in Fig. 1 of the drawing.

For the purpose of illustration, I have shown my improved ear snapping mechanism for corn harvester in connection with two longitudinally extending and forwardly inclined frame or snapping roll angle members 22 and 34. At spaced intervals along the angle member 22 are substantially Z-shaped brackets 11 which have their vertically extending legs 15 secured to the angle 22 by means of bolts 23. The frame member 34 is laterally spaced from and vertically below the frame member 22. At spaced intervals along the angle member 34 are Z-shaped brackets 10 which have their vertically extending legs 14 secured to the angle member 34 by means of bolts 36. Located substantially in the longitudinal center between the frame members 22 and 34 is my improved form of snapping roll, generally indicated by the reference character 16. Embracing the roll 16 is a spirally arranged rod or spring 17 which extends from one end of the roll to the other. The snapping roll 16 is journaled in suitable bearings 18 and 19 located at the forward and rearward ends respectively of the roller. The forward end of the roll 16 is provided with a pointed extension 20. The pointed extension is provided with a spiral extension 21 of the spiral rod or wire 17. Positioned above and parallel to the snapping roll angle or frame member 22 is a second angle member 24. The angle member 24 is held in spaced relation with respect to the angle member 22 by means of tubular spacing members 25 and bolts 26. These angle members 22 and 24 form a guide or channel within which a conveyor endless elevator chain 27 is adapted to travel. The chain 27 is trained about upper and lower sprocket wheels 28 and 29 respectively. At suitable intervals along the chain 27 are laterally projecting conveying fingers 30 formed on certain links of the chain 27. These fingers are provided with upwardly extending lugs 31 which engage the inner surface of the lower leg of the angle member 24 in guiding the chain longitudinally of and parallel to the snapping rolls 16. Positioned below the conveyor chain and extending parallel to the angle member 22 is a plate or sheet iron member 32 over which the ears of corn are conveyed towards the rear or delivery end of the snapping roll. Secured to the upwardly extending legs 12 and 13 of the respective brackets 10 and 11 are the usual gathering shields 33. The vertically spaced apart brackets 10 are secured to angle frame members 34 and 35. One of the angle members 34 is secured by means of bolts 36. The angle members 34 and 35 are further held in spaced apart relation with respect to each other by means of bolts 37. Positioned intermediate the angle members 34 and 35 is a third angle member 38. These angle members are secured in position by means of spacer tubes 39 and intermediate nuts 40 mounted in threaded engagement with the bolts 37. The positioning of these angle members 35 and 38 form in effect an L-shaped recess for the travel of the L-shaped lug 41 formed on certain of the links 42 of the snapping chain 43. The chain 43 is trained about upper and lower sprocket wheels 44 and 45 respectively. The sprocket wheel 45 is secured to a shaft 46 journaled in one of the frame sections. Secured to the under surface of the horizontal leg of the angle member 34 is a right angularly bent stalk protecting member or shield 46. Positioned below the outer laps of each of the chains or conveyors 27 and 43 are supporting plates 47 and 48 which are suitably connected to the frame structure in the manner well understood in the art. Positioned below and forwardly of the sprocket wheel 45 is a gathering chain 45'. The rear portion of the chain 45' is trained about a sprocket wheel (not shown) secured to the sprocket wheel shaft 46'. The forward end of the chain 45' is trained about a second sprocket wheel 47'. The chain 45' is provided with four equally spaced apart gathering fingers 48' for gathering in the corn stalks. Secured to the shaft 46' below the sprocket wheel 45 is a stripper cam 49' which has two lobes arranged and timed to strip the stalks from and in advance of each of the spring fingers 48'.

The novel features of the present invention embodies the relative rear travel speed of the snapping roll chain 43 with respect to the rearward travel of the spiral 17 on the snapping rolls 16. In this connection, the travel of the snapping chain 43 in its rearward and upward direction is substantially faster than the rearward movement caused by the pitch of the spiral 17 so that when an ear of corn is engaged by the chain 43, it is actuated at a sufficiently faster speed as to cause the ear to rotate about its attachment to the stalk and thereby twist the ear therefrom so as to provide a more efficient ear snapping mechanism. To state it in other words, the pitch or inclination of the spiral 17 on the roller 16 is such that it moves the stalk of corn rearwardly at substantially the same speed that the whole machine moves forwardly. At the same time, the chain 42 moves rearwardly at a substantially faster speed than the machine moves forwardly, thus causing the ear of corn to be revolved or twisted with respect to the stalk in snapping it therefrom. Obviously, the speeds of these parts, i. e., the differential speed of the chain 42 and the spiral 17, may be such so that the speed of the spiral conveys the corn stalks rearwardly more rapidly than the chain 42 moves rearwardly so that such differential speed of these parts as above indicated, would, of course, accomplish the same result.

While in the above specification I have described one embodiment which my invention may assume in practice, it will of course be understood that the same is capable of modification and that modification may be made without departing from the spirit and scope of the invention as expressed in the following claims.

What I claim as my invention and desire to secure by Letters Patent:

1. An ear snapping mechanism for a corn harvester comprising a frame, means for conveying stalks and ears of corn rearwardly with respect to said frame, and means engageable with one side only of the ears of corn, for revolving said ears with respect to the stalks for snapping them therefrom.

2. An ear snapping mechanism for a corn harvester comprising a frame, and continuously and rearwardly moving means having a differential speed for revolving the ears of corn with respect to its stalk for snapping the same therefrom.

3. An ear snapping mechanism for a corn harvester comprising a frame, said frame including two longitudinally extending inclined laterally spaced apart sections, a spirally ribbed roller mounted between said sections, means for rotating said roller for conveying stalks and ears of corn rearwardly at a certain speed, an endless chain located adjacent to said roller, and means for driving said chain for conveying said ears rearwardly at a relatively faster speed than said roller for revolving the ears of corn with respect to the stalks for snapping the same therefrom.

4. An ear snapping mechanism for a corn harvester comprising a frame, said frame including two longitudinally extending inclined laterally spaced apart sections, an inclined snapping roller mounted between said sections, bearings mounted on one of said sections in which said roller is journaled, a spirally arranged rod secured to the peripheral surface of said roller, means for driving said roller, an endless chain mounted on the other frame section and positioned in cooperative relation with respect to said roller, and means for driving said chain, the conveying speed of said chain being greater than that of the rearward travel imparted to the ear of corn by said spiral whereby the ear of corn is rotated with respect to the stalk to snap the same therefrom.

5. An ear snapping mechanism for a corn harvester comprising a frame, said frame including two longitudinally extending inclined laterally spaced apart sections, an inclined snapping roller mounted between said sections, bearings mounted on one of said sections in which said roller is journaled, a spirally arranged rod secured to the peripheral surface of said roller, means for driving said roller, an endless chain mounted on the other frame section, the inner lap of said chain positioned at one side of and above the axial center of said roller, means for driving said chain, said chain having a greater rearward speed than the rearward conveying speed of said spiral for imparting a twist to the ears of corn engaged thereby for snapping them from the stalks.

6. An ear snapping mechanism for a corn harvester comprising a frame, said frame including two longitudinally extending inclined laterally placed apart sections, a spirally ribbed roller mounted between said sections, means for driving said roller for conveying the corn stalks rearwardly at a certain speed, an endless chain mounted on one of said sections and to one side of and above the axis of said roller, and means for driving said chain whereby the ears of corn are to move rearwardly at a relatively faster speed than the conveying speed of said roller for rotating said ears with respect to the stalks for snapping them therefrom.

7. An ear snapping mechanism for corn harvester comprising a frame, said frame including two longitudinally extending inclined laterally spaced apart sections, means mounted on one section for conveying ears and stalks of corn rearwardly, means for driving said first named means, means mounted in substantially the same plane with said first named means and on the other section for conveying said ears rearwardly at a different speed, and means for driving said last named means.

8. An ear snapping mechanism for corn harvester comprising a frame, means mounted on said frame for conveying stalks and ears of corn rearwardly with respect to said frame, means mounted on said frame having an accelerated speed and cooperating with said first named means to revolve said ears to snap them from said stalks, and means for driving both of said first named means.

9. An ear snapping mechanism for a corn harvester comprising a frame, means mounted on said frame for conveying stalks and ears of corn rearwardly with respect to said frame, an endless chain mounted on said frame and engageable with said ears for imparting a rotating motion to said ears, and means for driving said first named means and said chain.

10. An ear snapping mechanism for corn harvester comprising a frame, means mounted on said frame for conveying stalks and ears of corn rearwardly with respect to said frame, an endless chain mounted on said frame and engageable with said ears for imparting a rotating motion to said ears, means for driving said first named means and said chain, a gathering chain positioned forwardly of and driven by said first named chain, spaced apart fingers carried by said gathering chain, and a revolving stripper located at the rearward end of said gathering chain for stripping said fingers.

11. An ear snapping mechanism for corn harvester comprising a frame, said frame including two longitudinally extending inclined laterally spaced apart sections, a spirally ribbed roller mounted between said sections, means for rotating said roller for conveying the stalks and ears of corn rearwardly at a certain speed, an endless chain located adjacent to said roller, and means for driving said chain for conveying said ears rearwardly at a relatively different speed than said roller for revolving the ears of corn with respect to the stalks for snapping the same therefrom.

HERMAN J. HAHN.